Figure 1:
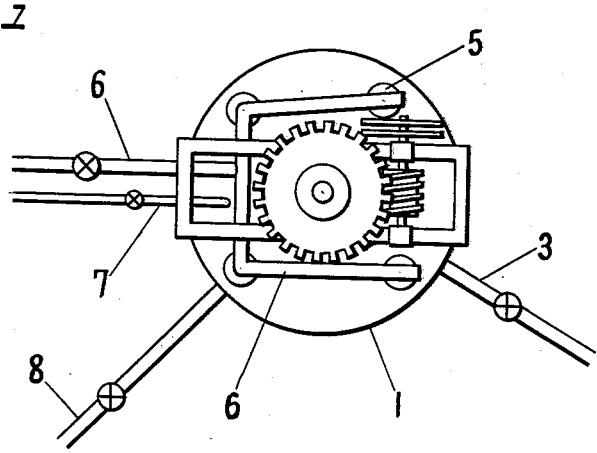

Feb. 19, 1963　　　HIROSHI MORIMOTO　　　3,077,987
METHOD OF FILTRATION BY FLOATING FILTER MEDIA
Filed Oct. 22, 1958　　　　　　　　　　　　　　5 Sheets-Sheet 1

Inventor
Hiroshi Morimoto
By Watson Cole Grindle & Watson
Attys

Feb. 19, 1963 HIROSHI MORIMOTO 3,077,987
METHOD OF FILTRATION BY FLOATING FILTER MEDIA
Filed Oct. 22, 1958 5 Sheets-Sheet 2
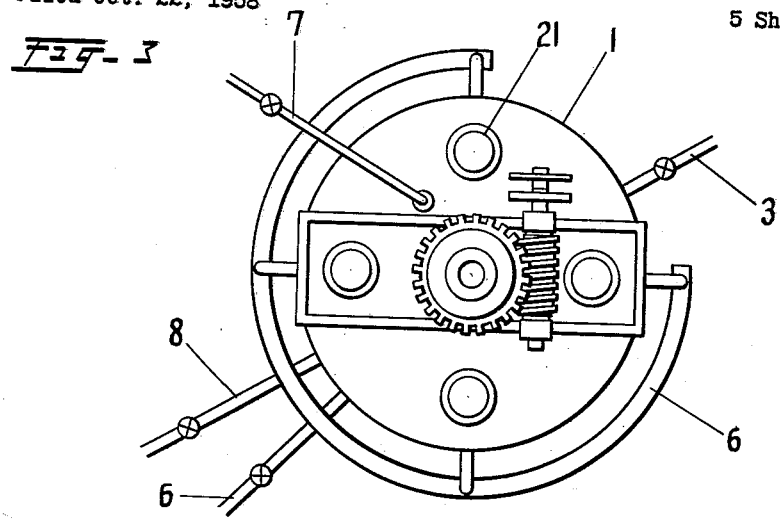
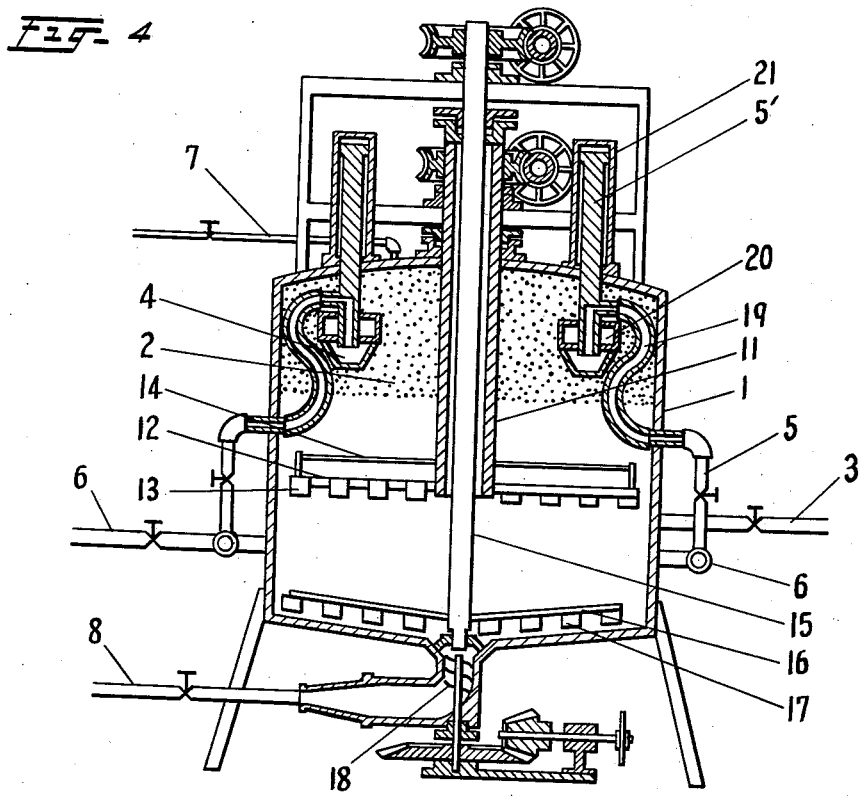
Inventor
Hiroshi Morimoto
By
Watson, Cole, Grindle + Watson
Attys.

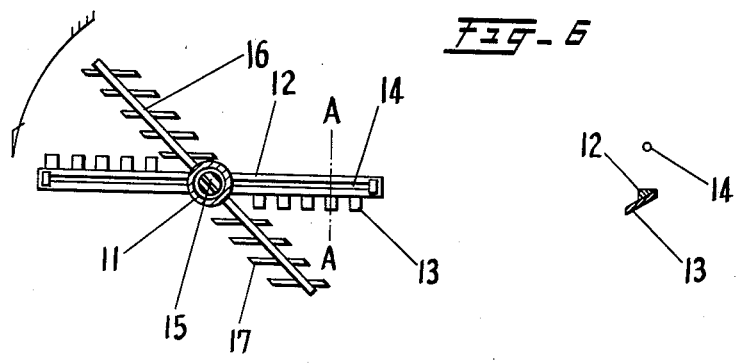
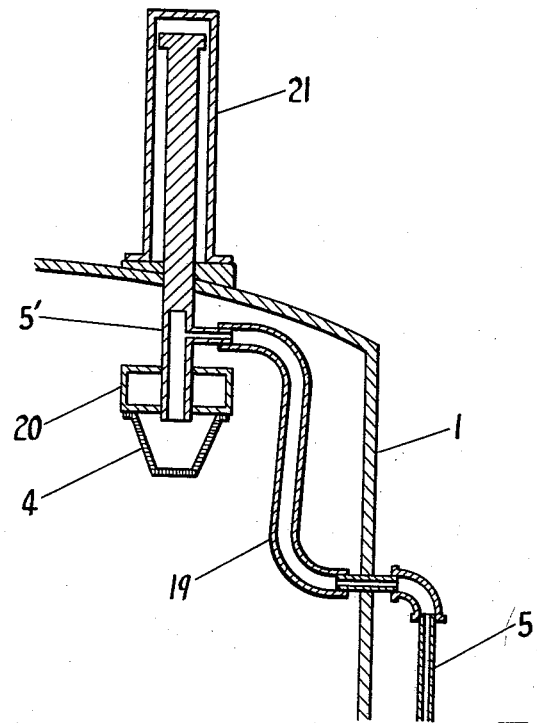

Feb. 19, 1963  HIROSHI MORIMOTO  3,077,987
METHOD OF FILTRATION BY FLOATING FILTER MEDIA
Filed Oct. 22, 1958  5 Sheets-Sheet 4

Inventor
Hiroshi Morimoto
By
Watson, Cole, Grindle & Watson
Attys.

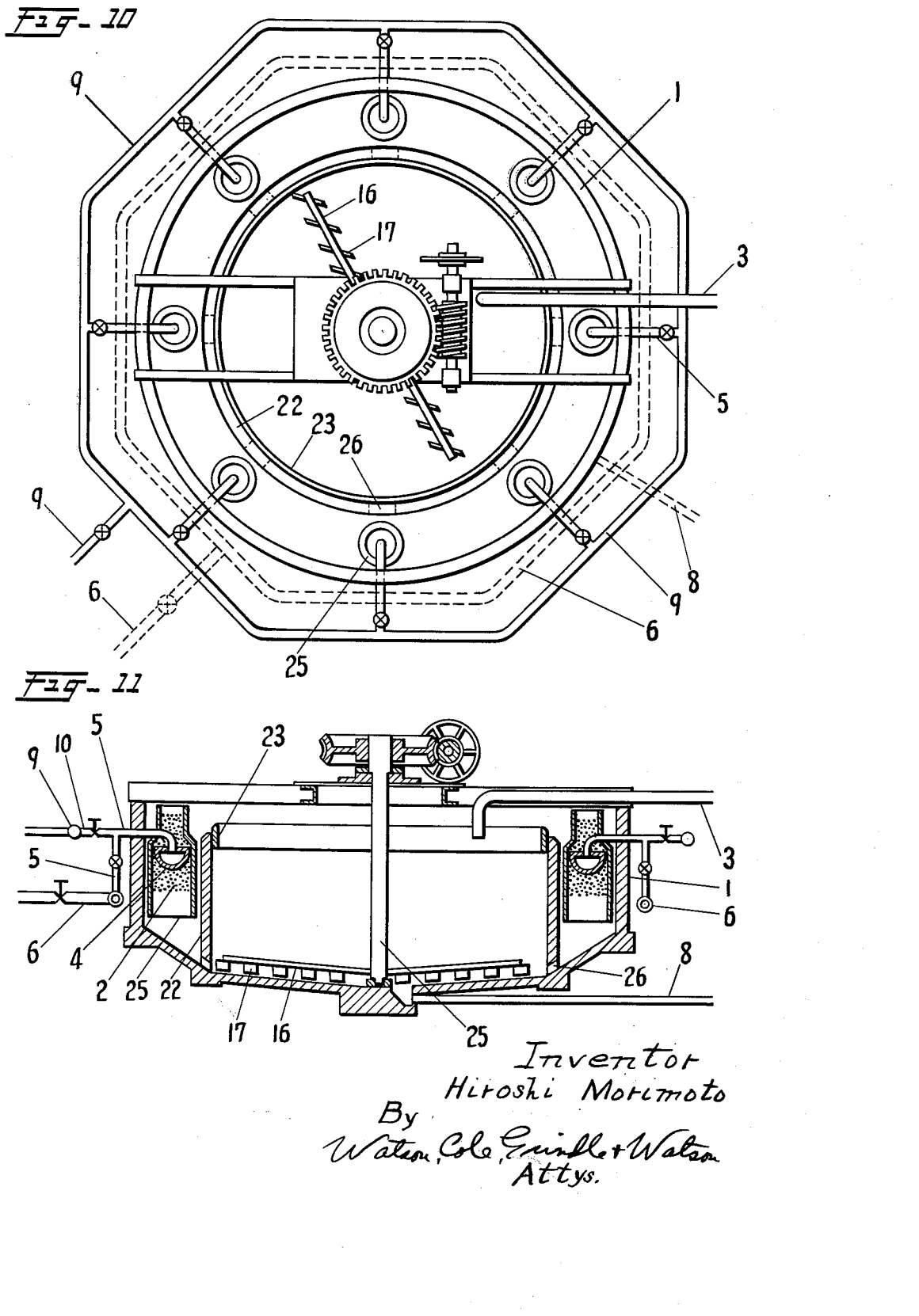

3,077,987
METHOD OF FILTRATION BY FLOATING
FILTER MEDIA
Hiroshi Morimoto, 43 Mandai Higashi 3-chome,
Sumiyoshi-ku, Osaka, Japan
Filed Oct. 22, 1958, Ser. No. 768,891
3 Claims. (Cl. 210—77)

This invention relates to a method of filtration using filter media which float on the surface of the liquid to be filtered.

According to this invention, the filtration of liquid is carried out by using grains and granulated particles which will float on the surface of the liquid to be filtered and form compact floating filter stratum through which the liquid percolates and the solid particles contained in the liquid are strained and collected on the under surface of the floating filter stratum.

It is an object of the present invention to provide a method of filtration which is to make possible to use innumerable synthetic resin grains as filtering media.

It is another object of the present invention to provide a method of filtration which is to change easily the thickness of floating filter stratum to meet the requirements of clarity of the filtrates.

It is another object of the present invention to provide a method of filtration which is to clean easily the filter media and to remove easily the mud cake.

It is another object of the present invention to provide a method of filtration which is to minimize the interference of sludge accumulation on the filter surface which lowers filtering efficiency.

It is a further object of the present invention to provide a method of filtration which is to make nil the deterioration and loss of filter media by the needlessness of replacement of filter media.

It is a further object of the present invention to provide a method of filtration which is to make no waste in washing water as synthetic resins float and separate from the heavier sediments.

According to the present invention, synthetic resin grains of polyethylene are used as filter media to form a floating stratum on the surface of the liquid to be filtered. Synthetic resin grains ranging in sizes between 100 to 30 mesh are placed in an enclosed tank and the liquid to be filtered is fed into the tank. Synthetic resin grains are lighter than the liquid and float on the surface of the liquid in the tank and form a compact floating stratum over the entire surface of the liquid. The compact stratum is found to be ideal for filtering liquid. The coarser grains mass in the upper part and the finer grains in the lower part of the stratum. The synthetic resin filter media do not become water-logged. Strainers are embedded in the floating stratum to prevent the filtering media from flowing out of the tank. Strainers are connected to filtrate outlet pipes. Compressed air is led into the tank to force the floating stratum downward to squeeze out excessive water in the sludge. Wire is stretched horizontally on rotating arms placed near the middle of the tank to slice off the sludge cake deposited on the under surface of the floating filter stratum. Blades are attached to the horizontal rotating arms to agitate the filter media and remove the slime and mud adhering to the filter media. Filtrate is back flowed into the tank to wash the filter media. A second pair of rotating arms with scraper blades is placed at the bottom of the tank to gather the sludge sediments to the center of the tank bottom where the sludge outlet is located.

It is to be expressly understood that the drawings are for the purpose of illustration and description only and are not intended as a definition of the limits of the invention.

Figure 2:
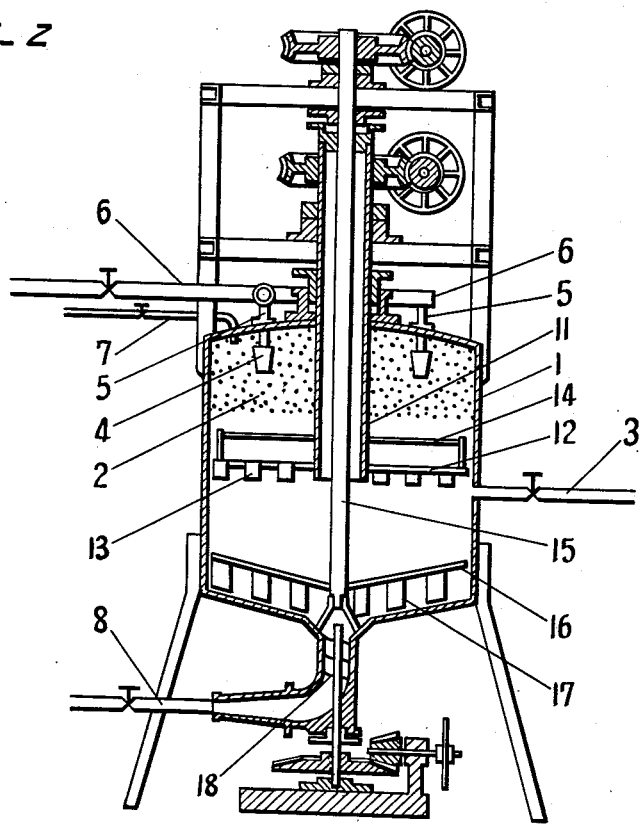
Figure 8:
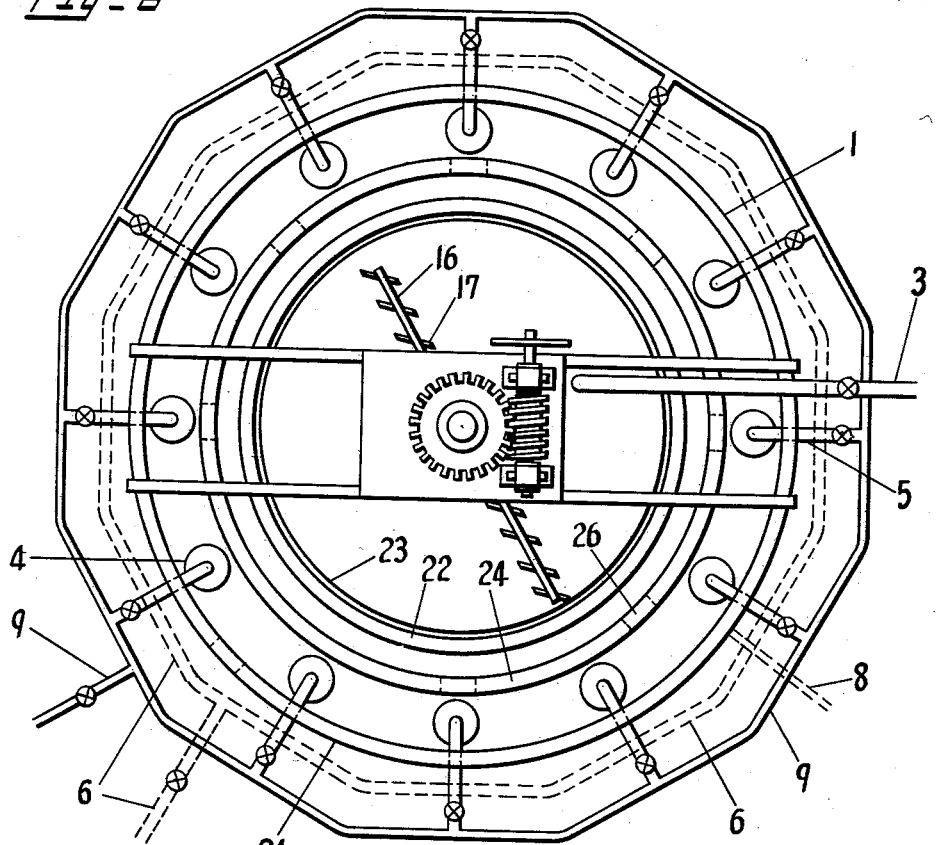
Figure 9:
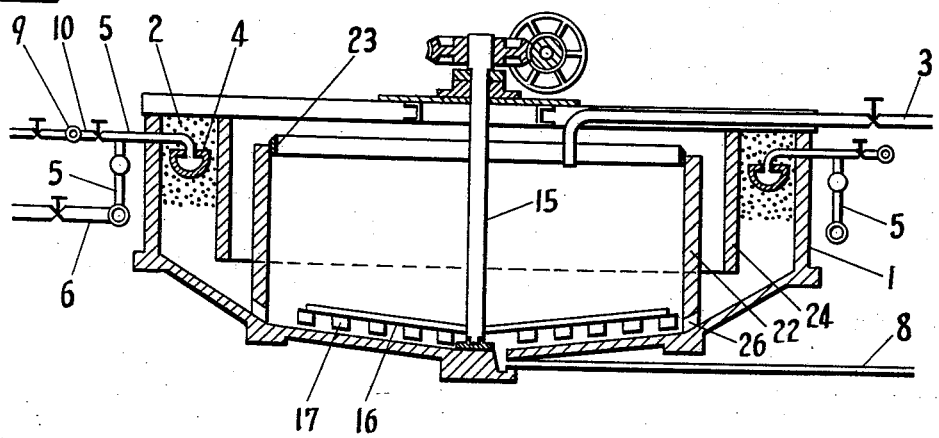

FIGURE 1 is the plan view of an enclosed type filter according to this invention;
FIGURE 2 is the vertical sectional view;
FIGURES 3 and 4 are the plan and vertical sectional views respectively for a modified enclosed type filter;
FIGURE 5 is the plan view of the rotating arms;
FIGURE 6 is the sectional view of the upper rotating arm;
FIGURE 7 is an enlarged sectional view of the strainer and filtrate pipe arrangement of the modified enclosed type;
FIGURE 8 is the plan view of an open type filter;
FIGURE 9 is the vertical sectional view; and
FIGURES 10 and 11 are the plan and vertical sectional views respectively of a modified open type filter.

In the enclosed or pressure type filter (refer to FIGURES 1, 2, 5 and 6) an enclosed tank 1 is charged with synthetic resin grain filter media 2 which are lighter than the liquid to be filtered. Liquid to be filtered is fed into the tank 1 through the feed inlet pipe 3. Because the filter media 2 are lighter than the liquid, they float on the surface of the liquid in the tank. When the tank is completely filled the floating filter media form a compact floating filter stratum on the upper part of the enclosed tank 1 as shown in FIGURE 2. The filter is now ready for filtering operation.

As the liquid is fed into the tank 1 through the feed inlet pipe 3 the larger and heavier particles contained in the feed settle readily to the bottom of the tank. The smaller and lighter dispersed particles whose settling rates are slower than the upward flow of the liquid in the tank flow upward with the liquid until they strike the lower or under surface of the floating filter stratum composed of filter media 2. The particles are caught and deposited on the under surface of the floating stratum. The clarified liquid percolates through the floating filter stratum and is further clarified and reaches the strainers 4. These strainers prevent the filter media from flowing with the filtered liquid. The filtered liquid passes through the strainers 4 and out of the tank 1 through the filtrate outlet pipes 5 and filtrate main pipe 6.

After a period of operation mud cake deposit on the under surface of the floating filter stratum thickens and lowers the filter efficiency. It is necessary to remove the mud cake. Feeding of liquid into the tank 1 is temporarily stopped and air is admitted into the top of the tank through air pipe 7 under pressure. Compressed air displaces the floating stratum which in turn displaces a portion of the liquid in the tank. The displaced liquid flows through the floating stratum and strainers and is forced out of the tank through the filtrate outlet. During this operation the floating filter stratum is forced downward without being disturbed as a compacted mass and acts as a pervious piston and the tank acts as a cylinder. Compressed air is admitted until the bottom of the floating stratum reaches the cake slicers 14 which are made of wires stretched over the horizontal agitating arms 12. Admittance of air is stopped and the hollow shaft 11 which carries the agitating arms 12 and the cake slicers 14 is slowly rotated. The rotation of the cake slicers over a vertical axis cuts a horizontal seam in the floating filter stratum and mud cake deposit. The loosened mud cake settles to the bottom of the tank. Inclining agitating blades 13 are attached to the agitating arms 12. By rotating the hollow shaft 11 which carries the agitating arms and blades the lower portion of the floating stratum is agitated. Sludge adhering to the filter media is removed and permitted to settle. The cleaned filter media float back to the underside of the stratum. Filtrate is permitted to back flow into the tank and further washes the filter media.

The admittance of filtrate into the tank forces the air out and raises the floating filter stratum to its original position at the top of the tank. The filter is now ready for another cycle of filtration.

The settled sludge is gathered to the center of the tank bottom by rotating shaft 15 on which rake arms 16 are attached. Rake blades 17 are attached to the rake arms 16 at an angle such that sediments caught on the rake blades 17 are pushed toward the center of the tank. Sludge leaves the tank through the sludge outlet pipe 8 connected to the center of the tank bottom. A screw conveyor mechanism 18 may be installed in the sludge outlet pipe 8.

In the modified enclosed or pressure type filter (refer to FIGURES 3, 4 and 7) strainers are arranged to move with the floating filter stratum and maintain the same relative position in the stratum at all times. Construction is the same as previously described except for the addition of floats 20, flexible filtrate pipes 19, adjusting bars 5' and adjusting bar guides 21. Float 20 is attached to the adjusting bar 5' which is bored at the bottom end to permit flow of filtrate from strainer 4 into the flexible filtrate pipe 19, thence to the filtrate pipe 5. Adjusting bar guide 21 is a hollow cylinder in which the adjusting bar 5' slides when the strainer 4 moves upward or downward with the floating filter stratum. This arrangement permits better dewatering of the sludge.

In the open type filter (refer to FIGURES 8 and 9) liquid is fed into the center of the tank 1 through the feed inlet pipe 3. The tank 1 is constructed with two concentric baffles, the inner over-flow baffle 22 and the outer under-flow baffle 24. The portion within the over-flow baffle 22 is used as a settling basin to settle out the larger and heavier solid particles. Liquid with lighter and finer particles over-flows the over-flow adjusting weir 23 which is placed on the top of the over-flow baffle 22. After passing over the over-flow adjusting weir 23, the liquid flows downward between the over-flow baffle 22 and the under-flow baffle 24. Then the liquid flows upward between the under-flow baffle 24 and the wall of the tank 1. Floating filter media 2 are charged into the channel between the under-flow baffle 24 and the wall of the tank 1 to form a floating filter stratum. The light and fine dispersed particles in the liquid are caught on the under surface of the floating stratum and the clean liquid passes through the floating stratum to the strainers 4 thence to the filtrate outlet pipes 5 and the filtrate main pipe 6. Mud cake accumulated on the under surface of the floating stratum is removed by feeding wash water through wash water main 9 and wash water laterals 10, filtrate outlet pipe 5 and strainers 4. When wash water is forced through the filter stratum, the stratum is agitated and the filter media are easily cleaned and separated from the mud. The separated mud settles to the bottom and passes through the mud ports 26 at the bottom of the over-flow baffle 22 and into the settling basin where the larger and heavier particles have previously been settled. By rotating shaft 15 rake arms 16 are rotated. Rake blades 17 attached to the rake arms 16 move the sludge toward the center of the tank where the sludge outlet is located. Sludge is removed from the tank through sludge outlet pipe 8.

In the modified open type filter (refer to FIGURES 10 and 11) the under-flow baffle is omitted and open and filter media containers 25 are used. Operation is the same as the open type filter. This arrangement is economical in the use of filter media.

The embodiments of the invention in which an exclusive property of privilege is claimed, are defined as follows:

1. The method of filtration which comprises providing in a confined filtration zone an amount of particulate filter media less than the volume of said zone but sufficient to form a stratum of appreciable thickness therein, passing upwardly through said zone liquid to be filtered having a density greater than that of said filter media, whereby said media forms a compact stratum floating adjacent the surface of the liquid being filtered in said zone, removing the liquid from said zone after passage through the media, and periodically detaching from the bottom of the stratum solids accumulated there while maintaining the stratum in essentially undisturbed condition, and wherein said accumulated solids are detached by rotating a thin cutting element along a fixed locus in said zone normally spaced from the lower extremity of the stratum and moving said stratum bodily downwardly until said solids are cut away from the stratum by the element.

2. The method of claim 1 including the step of accumulating the removed solids in a localized area at the bottom of said zone and removing the accumulated solids through the zone bottom.

3. The method of filtration by movable filter bed floating adjacent the surface of the liquid which comprises passing the liquid to be filtered upward through a confined zone containing a layer of particulate filter media having a density less than that of the liquid to be filtered to cause a layer of filter media to float adjacent the surface of the liquid in said zone while removing the filtered liquid from said zone at least one point within the interior of the movable filter bed through the end of filtrate pipe which is embedded in the movable filter bed and provided with strainer, float, self-adjusting sliding guide mechanism, and flexible tube connection to provide for freedom of movements vertically, said float made to float in the movable filter bed and moving the filtrate pipe with the movable filter bed to any level within the confined filtration zone, moving the movable filter bed and maintaining said bed at any desired liquid level in said zone by admission of gas under pressure to the top of said zone whereby filtration operation is conducted at any liquid level within said zone and removing solids from said zone bottom.

References Cited in the file of this patent

UNITED STATES PATENTS

| 468,984 | Boeing | Feb. 16, 1892 |
| 1,483,858 | Hepburn | Feb. 12, 1924 |
| 2,101,961 | Slidell | Dec. 14, 1937 |
| 2,732,947 | White | Jan. 31, 1956 |
| 2,855,364 | Roberts | Oct. 7, 1958 |

FOREIGN PATENTS

| 16,604 | Great Britain | of 1891 |